United States Patent
Nair et al.

(10) Patent No.: US 11,650,552 B2
(45) Date of Patent: May 16, 2023

(54) APPARATUS TO ESTIMATE THE ROOT MEANS SQUARE VALUE OR THE AMPLITUDE OF LIMIT CYCLE OSCILLATIONS IN SYSTEMS THAT ENCOUNTER OSCILLATORY INSTABILITIES AND METHODS THEREOF

(71) Applicant: INDIAN INSTITUTE OF TECHNOLOGY MADRAS (IIT MADRAS), Chennai (IN)

(72) Inventors: Sujith Raman Pillai Indusekharan Nair, Chennai (IN); Akshay Seshadri, Chennai (IN); Induja Pavithran, Chennai (IN)

(73) Assignee: Indian Institute of Technology, Chennai (IN)

( * ) Notice: Subject to any disclaimer, the term of this patent is extended or adjusted under 35 U.S.C. 154(b) by 294 days.

(21) Appl. No.: 16/605,054

(22) PCT Filed: Apr. 19, 2018

(86) PCT No.: PCT/IN2018/050236
§ 371 (c)(1),
(2) Date: Oct. 14, 2019

(87) PCT Pub. No.: WO2018/198132
PCT Pub. Date: Nov. 1, 2018

(65) Prior Publication Data
US 2021/0132555 A1    May 6, 2021

(30) Foreign Application Priority Data

Apr. 27, 2017 (IN) .............................. 201741014957

(51) Int. Cl.
*G05B 13/04* (2006.01)
*G01H 1/00* (2006.01)
*G01M 15/14* (2006.01)

(52) U.S. Cl.
CPC .............. *G05B 13/048* (2013.01); *G01H 1/00* (2013.01); *G01M 15/14* (2013.01)

(58) Field of Classification Search
CPC ...... G05B 13/00; G05B 13/04; G05B 13/048; G01M 15/00; G01M 15/14; G01M 13/028; G01M 13/045
See application file for complete search history.

(56) References Cited

U.S. PATENT DOCUMENTS

2015/0260609 A1* 9/2015 Vinod ................. G01M 13/028
                                                  702/56
2017/0051683 A1* 2/2017 Murugesan ............ F23M 11/04

OTHER PUBLICATIONS

Gorinevsky, Dimitry "Amplitude and Phase Control in Active Suppression of Combustion Instability," 2012, American Control Conference, pp. 2601-2608. (Year: 2012).*

* cited by examiner

*Primary Examiner* — Son T Le
*Assistant Examiner* — Matthew W. Baca

(57) ABSTRACT

Oscillatory instabilities are ubiquitous of systems, and these usually arise out of low amplitude aperiodic oscillations. These oscillatory instabilities generally affect the performance and the lifespan of systems in an adverse manner. An apparatus and a method are disclosed here to estimate the rms value or the amplitude of limit cycle oscillations for control of the oscillatory instability.

10 Claims, 1 Drawing Sheet

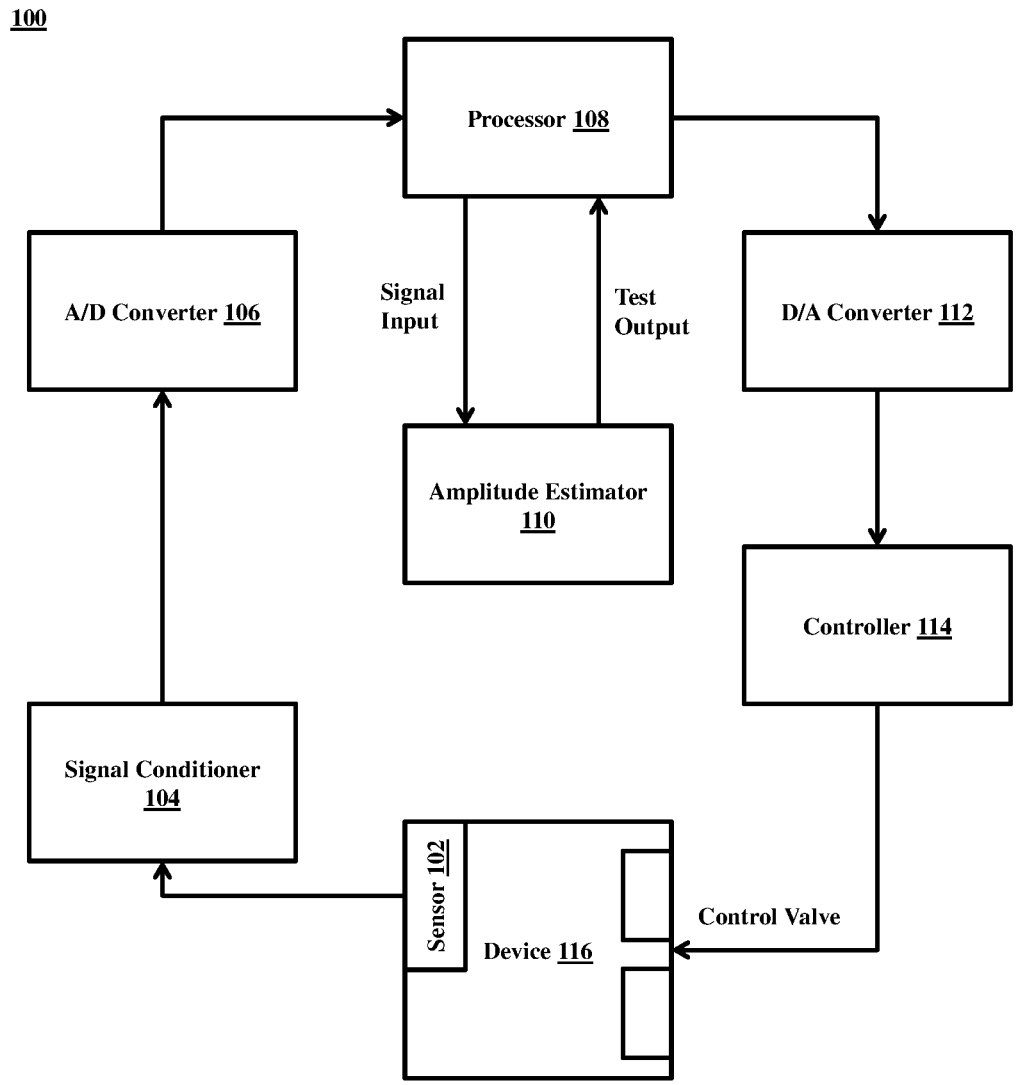

APPARATUS TO ESTIMATE THE ROOT MEANS SQUARE VALUE OR THE AMPLITUDE OF LIMIT CYCLE OSCILLATIONS IN SYSTEMS THAT ENCOUNTER OSCILLATORY INSTABILITIES AND METHODS THEREOF

FIELD OF THE INVENTION

The invention relates to devices and methods that estimate the root mean square (rms) value or amplitude of oscillations during oscillatory instability such as thermoacoustic instability or aeroacoustic instability or aeroelastic instability, and use this for improved operation or control of the system.

BACKGROUND OF THE INVENTION

Oscillatory instabilities are ubiquitous in a variety of systems, and these usually arise out of low amplitude aperiodic oscillations in situations involving turbulent flow. These oscillatory instabilities generally affect the performance and the lifespan of systems in an adverse manner. Because such instabilities can, and often, exhibit large amplitude of oscillation, they may render the system useless. The oscillatory instability encountered in several combustion systems bears all these hallmarks, and can severely cripple the operation of the system. In particular, the large amplitude of acoustic pressure oscillations and huge amounts of heat transferred to the walls of the combustor negatively affect the performance of the combustor. This, combined with the fact that the processes involved in the dynamics of such a system are very complex, has made countering of these instabilities a challenging task for the industry. Because such instabilities need to be avoided, the functioning of the system must be restricted to the stable operating regime. Thus, it is very useful to know beforehand, the amplitude of oscillations that will be seen during the instability, so that operator may appropriately monitor and control the system.

Most of the previously existing methods for the estimation of limit cycle amplitude makes use of flame transfer function or flame describing functions (Boudy et al. (2013) & Cosic et al. (2013)). Later it is extended by solving the pressure wave equation via the modified Galerkin method, to include nonlinear heat release models in the form of Flame Describing Functions as well as acoustic losses at the boundaries (Krediet et al. (2010)). The accuracy in the prediction of the limit cycle pressure amplitude in those methods is sensitive to both the Flame Describing Function (FDF) and the acoustic boundary conditions. In another paper Simon et al. (2004) tried incorporating nonlinear flame describing function. In these methods, to obtain Flame Describing Function, we need to force the system at high amplitudes which is very difficult in industrial systems.

Therefore, there exists a need in the art to develop an apparatus and a method to predict the amplitude of limit cycle oscillations that can be used in industrial systems without much difficulty, without obtaining the flame describing function. In a method disclosed here for amplitude estimation, the calculation of the oscillatory variables and their amplitude in a kicked oscillator are employed in estimating the amplitude or rms value of oscillations in the actual system. And the predicted results are in good agreement with the observed values in the experiments.

The method employed in the apparatus of the invention does not require any forcing. It is more efficient and there is no need of FDF at all, and the predictions are in good agreement with the experimentally observed values.

REFERENCES

BOUDY, F., SCHULLER, T., DUROX, D. & CANDEL, S. 2013 The flame describing function (FDF) unified framework for combustion instability analysis: progress and limitations. *Int'l Summer School and Workshop on Non-Normal and Nonlinear Effects in Aero- and Thermoacoustics, Munich.*

COSIC, B. & MOECK, J. P., & PASCHEREIT, C. O., 2013 Prediction of pressure amplitudes of self-excited thermoacoustic instabilities for a partially premixed swirl-flame. *ASME Turbo Expo 2013: Turbine Technical Conference and Exposition.*

KREDIET, H. J., KREBS, W., PORTILLO, J. E., & KOK, J. 2010 Prediction of thermoacoustic limit cycles during premixed combustion using the modified Galerkin approach. *46th AIAA/ASME/SAE/ASEE Joint Propulsion Conference.*

MATVEEV, K. I. & CULICK, F. E. C. 2003 A model for combustion instability involving vortex shedding. *Combustion Science and Technology*, 175, 1059-1083.

NAIR, V. & SUJITH, R. I. 2015 A reduced-order model for the onset of combustion instability Physical mechanisms for intermittency and precursors. *Proceedings of the Combustion Institute*, 35, 3193-3200.

NAIR, V. & SUJITH R. I. 2014 Multifractality in combustion noise: predicting an impending combustion instability. *J. Fluid Mech.* 747, 635-655.

BOUJO, E., DENISOV, A., SCHUERMANS, B. & NOIRAY, N. 2016 Quantifying acoustic damping using flame chemiluminescence. *arXiv preprint arXiv:1612.02609.*

SESHADRI, A., NAIR, V. & SUJITH, R. I. 2016 A reduced-order deterministic model describing intermittency route to combustion instability. *Combustion Theory and Modelling.*

STOW, S. R., & DOWLING, A. P. 2004 low-order modelling of thermoacoustic limit cycles. *Proceedings of ASME Turbo Expo 2004.*

OBJECTS OF THE INVENTION

It is an object of the invention to estimate the rms value or the amplitude of limit cycle oscillations in a class of systems that encounter oscillatory instabilities.

It is yet another object of the invention to disclose an efficient method to estimate the rms value or the amplitude of limit cycle oscillations in a class of systems that encounter oscillatory instabilities that can be used in industrial systems without forcing the system to obtain the flame transfer function or the describing function.

It is yet another object of the invention to disclose an apparatus to predict beforehand, the rms value or amplitude of oscillations that will be seen during the instability, so that operator may appropriately monitor and control the system. This technique for the prediction of the rms value or amplitude helps to implement a stability margin for the large amplitude limit cycle oscillations which are often detrimental to the gas turbine engines.

SUMMARY OF THE INVENTION

An apparatus for use in systems that undergo oscillatory instabilities, the apparatus comprising of a sensor mounted on the system to detect an oscillatory variable in the system;

an analog to digital convertor to convert the electrical signals received from the signal conditioner; an amplitude estimator that predicts the rms value or amplitude of the limit cycle oscillations, a processing unit connected to the amplitude estimator to compare the predicted oscillation amplitude or rms value with a threshold value; characterized in that the amplitude or rms value of the limit cycle oscillations is estimated by modelling the system exhibiting oscillatory instability as a kicked oscillator, generating the times at which oscillator is kicked using one or more parameters measured from the system, and obtaining the strength of kicking; and a controller to control the oscillatory variable based on the instructions received from the processing unit through the control device connected to the system.

A method of estimating rms or amplitude of limit cycle oscillations for systems susceptible to oscillatory instabilities comprising the steps of:
a. detecting an oscillatory variable causing the oscillations using a sensor mounted on the system;
b. converting the signal into digital signals in an analog-digital convertor;
c. estimating the rms value or the amplitude of the limit cycle oscillations using an amplitude estimator from data obtained from the said analog-digital convertor
d. comparing the estimated value of the rms or the amplitude of limit cycle oscillations with a threshold value for the system and create appropriate instructions for controlling the system parameters to restore stable operation; and
e. restoring the stability of the system by suitably adjusting the system parameters.

BRIEF DESCRIPTION OF THE DRAWINGS

FIG. 1 shows a block diagram representing the system used to estimate the rms value or the amplitude of limit cycle oscillations.

DETAILED DESCRIPTION OF THE INVENTION

The method and apparatus of the present invention can be described by referring to FIG. 1

FIG. 1 shows a system 100 for use in a device 116 that undergoes oscillations, the apparatus 100 comprising of a sensor 102 to detect the oscillatory variable, a signal conditioner 104 connected to the sensor 102 to condition and filter electrical signals required to be studied, an Analog-Digital Convertor 106 (A/D Converter 106) to convert the electrical signals received from the signal conditioner 104, a processor 108 and an amplitude estimator 110 connected to the processor 108 to compare the oscillation amplitude or rms with a threshold value, and send appropriate instruction for a controller 114 to control the oscillatory variable through the device 116 (or control device 116) to control to alter one or more operating inputs to restore stable operation of the system 100. The operating inputs include but not limited to air or fuel flow rate, degree of premixing or preheat temperature of air or fuel, length of the flame, fuel splitting, distribution of fuel or fuel injection or flame length and the like or their combinations.

Optionally, the instructions may be converted into analog signals by a digital to analog convertor 112 before being sent to the control device 116 via the controller 114.

An embodiment of the invention essentially comprises of two parts: method of calculating the envelope of the oscillatory variable in the system 100 using an amplitude equation, and a procedure that estimates the limit cycle oscillation amplitude or rms value using this amplitude equation and supplied data. Time series of the relevant oscillations in the system is the data that is required by the procedure. In an exemplary case of combustion systems, the relevant oscillatory variable can be the acoustic pressure, which can be obtained by using a pressure transducer. A possible realization of this invention would involve an apparatus that can be appended to the system 100, which utilizes the data measured from the system 100, and displays the estimate of instability amplitude in real time.

The various embodiments of the invention are further described using exemplary case of the invention in use in combustions systems.

A kicked oscillator as the prototypical oscillator for the class of systems is considered. This choice is motivated by the modelling of the acoustic modes in certain combustion systems (Nair et al. (2015) & Matveev et al. (2003)). Say x, ẋ are the relevant variables of the system that undergo oscillations, the kicked oscillator equation is given as $$\ddot{x} + \xi\dot{x} + \omega^2 x = B\sum_j \delta(t - t_j) \quad (1)$$

Here, the magnitude of the kick, B, is assumed to be constant, and the oscillator is kicked at time instants $\{t_j\}$. $\xi$ is the damping coefficient, w is the natural frequency, and $\delta(t)$ is the Dirac delta function.

(i) Expression for the Slow-Varying Amplitude

An expression for the slow-varying amplitude of such oscillations is first found. This is done by substituting $\dot{x}/\omega = A(t)e^{i\omega t}$, and then take the Laplace transform of Equation 1.

$$A(s) = \frac{B}{\omega}\left[\frac{(s+i\omega)\sum_j e^{-(s+i\omega)t_j}}{(s-\alpha 1)(s-\alpha 2)}\right] - \frac{\omega x(0)}{s+i\omega} + A(0) \quad (2)$$

Where $$\alpha_{1,2} = -\frac{\xi}{2} + i\left(-\omega \pm \frac{\omega_d}{2}\right)$$

$$\omega_d = \sqrt{4\omega^2 - \xi^2}$$

Taking the inverse Laplace transform of the above equation, the following is obtained $$A(t) = \frac{B}{\omega\omega_d}e^{-i\omega t}\sum_{j=1}^{N_k} e^{-\frac{\xi}{2}(t-t_j)}\left[-\xi\sin\left(\frac{\omega_d}{2}(t-t_j)\right) + \omega_d\cos\left(\frac{\omega_d}{2}(t-t_j)\right)\right] - \frac{2\omega x(0)}{\omega_d}e^{-i\omega t}e^{-\frac{\xi}{2}t}\sin\left(\frac{\omega}{2}t\right) + \frac{A(0)}{\omega_d}e^{-i\omega t}e^{-\frac{\xi}{2}t}\left[-\xi\sin\left(\frac{\omega_d}{2}(t-t_j)\right) + \omega_d\cos\left(\frac{\omega_d}{2}(t-t_j)\right)\right] \quad (3)$$

Where $N_k$ the number of kicks that have occurred till time t. The last two terms in the above equations are transient terms and will quickly decay due to $$e^{-\frac{\xi}{2}t}$$

factor. Hence, these terms are dropped. Since $\dot{x}/\omega = A(t)e^{i\omega t}$, we get, $$\ddot{x} = \frac{B}{\omega_d} \sum_{j=1}^{N_k} e^{-\frac{\xi}{2}(t-t_j)} \left[ -\xi \sin\left(\frac{\omega_d}{2}(t-t_j)\right) + \omega_d \cos\left(\frac{\omega_d}{2}(t-t_j)\right) \right] \quad (4)$$

This is the expression for the velocity ($\dot{x}$) of the kicked oscillator. With some rearrangement of terms, it can be shown that the expression for $\dot{x}$ can be written as $$\dot{x} = \frac{2B\omega}{\omega_d} \sqrt{\Lambda_c^2 + \Lambda_s^2} \, e^{-\frac{\xi}{2}t} \cos\left(\frac{\omega_d}{2}t - \phi\right) \quad (5)$$

$$\Lambda_c = \sum_{j=1}^{N_k} e^{\frac{\xi}{2}t_j} \cos\left(\frac{\omega_d}{2}t_j\right) \; \& \; \Lambda_s = \sum_{j=1}^{N_k} e^{\frac{\xi}{2}t_j} \sin\left(\frac{\omega_d}{2}t_j\right)$$

$$\tan(\phi) = \frac{\Lambda_s \omega_d - \Lambda_c \xi}{\Lambda_c \omega_d + \Lambda_s \xi}$$

Then, the expression for slow-varying amplitude for $\dot{x}$ becomes $$\hat{A}(t) = \frac{2B\omega}{\omega_d} \Lambda \, e^{-\frac{\xi}{2}t} \quad (6)$$

Where, $\Lambda = \sqrt{\Lambda_c^2 + \Lambda_s^2}$.

It is assumed that $\tilde{A}$ describes the envelope of the oscillations under consideration. For instance, in the case of a combustion system, this would be the envelope of the acoustic pressure. Utilizing $\tilde{A}$ as the central object, an amplitude estimation procedure is delineated.

(II) Estimation of Limit Cycle Oscillation Rms or Amplitude Using a Single Input Time Series It is assumed that the values of linear damping coefficient ($\xi$) in the system and the instability frequency ($\omega$) are known. There are methods for quantifying acoustic damping (Noiray et al.). Estimation procedure for the case when input data is either aperiodic (chaotic/noisy) or intermittent is described. A more general form of equation 6 is used for this purpose.

$$\overline{A}(t) = \overline{B} \Lambda \, e^{-\frac{\xi}{2}t} \quad (7)$$

Here, $\overline{B}$ is some unknown constant that is eventually estimated. We call $\overline{B}$ the kicking strength.

(i) Let $\overline{A}_0$ be the rms of the input time series, and let $T_a$ be its dominant time period. $T_a$ may be estimated though the amplitude spectrum taking of the input time series, by it as the inverse of the dominant frequency.

(ii) Define $p_a$ be the probability of aperiodicity, which is an estimate of the aperiodic content in the input time series. generally, for the class of systems we consider, the aperiodic oscillations are of low amplitude, the intermittent oscillations comprise of large amplitude periodic oscillations along with small amplitude aperiodic oscillations, and the limit cycle oscillations are of large amplitude. For such a case, $p_a$ can be found in the following manner: Find the peaks of the input time series. Then, fix a threshold that roughly demarcates the amplitude of the aperiodic oscillations from the periodic oscillations. The ratio of the number of peaks within the threshold to the total number of peaks gives $p_a$.

Nevertheless, $p_a$ can also be estimated using other measures that describe the amount of aperiodic content in the time series, like the Shannon entropy, the measure obtained from 0-1 test, or other such measures.

(iii) A method to model the kicking times $\{t_j\}$ using the information obtained from the input time series is given. Let C be a biased coin toss 1 occurs with probability $p_a$ and 0 with a probability $1-p_a$. Then the kicking times can be given recursively as $$t_j = t_{j-1} + (1 - C(p_a))T_a + C(p_a)\sigma T_a |N(0,1)| \quad (8)$$

where, $N(0,1)$ is the Gaussian white noise. Other types of noise may also be used depending on the system $t_0$ may be set zero. the value of $\sigma$ for aperiodic time series should be more than that for an intermittent time series. For instance, $\sigma$ may be set to 5 for aperiodic time series, and it may be set to 1 for intermittent time series. These are just ad-hoc values, and variations are allowed. It may also be possible to obtain or infer $\{t_j\}$ and $\sigma$ from the input time series.

(iv) A technique to determine the kicking strength $\overline{B}$ is provided here. First, a total amount of time is fixed, say $t_e$ seconds, and compute $\{t_j\}$ till $t_e$ using equation 8. $t_e$ can as such be any value, but must be much greater than $T_a$. The next step is to compute $$R(t) = \Lambda \, e^{-\frac{\xi}{2}t},$$

at every time instant from $t=0$ till $t=t_e$ (a small step size can be chosen of course). The estimate for $\overline{B}$ is given by taking the rms of R and diving $\overline{A}_0$ by this quantity, i.e., $\overline{B} = \overline{A}_0/\text{rms}(R(t))$.

(v) The limit cycle oscillations occur for $$t_j = t_{j-1} + 2\pi / \left(\frac{\omega_d}{2}\right).$$

Small amounts of noise can also be added to this limit cycle kicking times if one wishes. It is easy to see that the amplitude will be maximum for such a choice of kicking times. Now compute $\{t_j\}$ using this for some $N_e$ kicks (i.e., compute from $t_0$ till $t_{N_e}$). Then, the limit cycle amplitude ($\overline{A}_l$) can be found by using equation 7 evaluated at time $t=t_{N_e}$. Note that $N_e$ needs to be reasonably large for the transients to die out. Here, $\Lambda$ should be calculated using $\{t_j\}$ for limit cycle oscillations described above, and we have the estimate for $\overline{B}$ already. We need to notice that $A_l$ is an estimate of the rms of limit cycle oscillations, rather than the maximum amplitude. The reason for this is that we had estimated $\overline{B}$ using $\overline{A}_0$, which is the rms of the input time series, and not the maximum amplitude. Further, it is better to estimate the amplitude of the limit cycle oscillations using the rms value, because the amplitude in the actual physical system can show variation even during limit cycle oscillations. One may estimate the amplitude of limit cycle oscillations using this estimated rms value by multiplying the rms value by $\sqrt{2}$.

(vi) For robustness, compute $\overline{A}_l$ at least a few times, and the final estimate of the rms of limit cycle oscillations can be taken as the mean of these. Correspondingly, the final estimate of the amplitude of the limit cycle oscillations can be obtained by multiplying this final estimate of rms value by $\sqrt{2}$.

(III) Estimation of Limit Cycle Oscillation Rms or Amplitude Using Multiple Input Time Series Here, a procedure is outlined so that the estimates of rms or amplitude of limit cycle oscillations are robust when multiple input time series are utilized.

(i) The quantity obtained from the $i^{th}$ input time series is labeled as with a subscript i. So, $\overline{A}_{oi}$, $T_{ai}$, and $p_{ai}$ are the rms, dominant time period and the probability of aperiodicity of the $i^{th}$ input time series respectively.

(ii) Start with the first time series ($\overline{A}_{o1}$, $T_{a1}$, $p_{a1}$). Using the estimation procedure for single input time series, find the estimate for the strength of the kicking and call it $\overline{B}_1$ (steps (i)-(iv) of section II). For robustness, this process needs to be repeated a few times, and $\overline{B}_1$ can be taken as the mean of these.

(iii) Using $T_{a2}$, $p_{a2}$, $\overline{B}_1$ in equation 7, estimate the rms of the amplitude corresponding to the second input time series. The kicking times can be obtained from equation 8 for this purpose. Call the resulting estimate of the rms of limit cycle amplitude as $\overline{A}_{e2}$. As before, for robustness, $\overline{A}_{e2}$ can be taken as the mean of a few estimates. The new estimate for the kicking strength can then be given as $\overline{B}_2 = \overline{B}_1 (\overline{A}_{o2}/\overline{A}_{e2})$.

(iv) Repeat steps (ii) and (iii) above iteratively to get the estimate for kicking strength for the $i^{th}$ input time series: $\overline{B}_i = \overline{B}_{i-1} (\overline{A}_{oi}/\overline{A}_{ei})$. The final estimate for the kicking strength can be taken as the mean of all the obtained estimates, i.e., $B = \sum_{i=1}^{N} \overline{B}/N$.

(v) Finally, use $\overline{B}$ to estimate the rms value or the amplitude of limit cycle oscillations (as described in steps (v) and (vi) of section (II)).

This procedure can also be used to estimate the rms or amplitude of limit cycle oscillations in real-time, even if the control parameter is varied slowly: Break the real-time data into segments of a fixed length, and label each segment contiguously. Then use the multiple data estimation procedure described in section (III), where each such segment is taken as an input time series. The length of these segments may be varied if it provides any additional advantage. It is also possible that the estimate of rms value or amplitude of limit cycle oscillations is obtained by utilizing some fixed number of segments (as a new segment arrives in real-time, delete the oldest segment).

It is additionally noted that the procedure has been described for the amplitude of $\dot{x}$. However, expression for amplitude of x is very similar to 6, and hence, the estimation procedure can be easily extended to account for this case.

Example

The data obtained from a bluff body stabilized turbulent combustor (Nair et al. (2014)) is used. The linear damping was taken as $\xi = 29$ (Nair et al. (2015)), and the frequency of limit cycle oscillations was 248 Hz, which occurred at $R_e = 2.8 \times 10^4$. The rms of limit cycle oscillations was 1314.27 Pa. The threshold to find $p_a$ was set at 340 Pa. The estimation procedure was repeated (due to stochasticity in the model for the kicking times) to get reasonable estimates.

| $R_e$ | $\overline{A}_0$ | $T_a$ | $P_a$ | $\sigma$ | $\overline{A}_l$ |
|---|---|---|---|---|---|
| $1.91 \times 10^4$ | 151.77 | 252 | 0.9827 | 5 | 1704.75 |
| $2.18 \times 10^4$ | 184.82 | 264 | 0.9369 | 1 | 915.66 |
| $2.38 \times 10^4$ | 230.88 | 248 | 0.8727 | 1 | 1109.73 |
| $2.50 \times 10^4$ | 289.61 | 224 | 0.7322 | 1 | 1389.19 |

Now, the above pressure time series together were used in the second estimation procedure. The estimate of rms of limit cycle oscillations in this case was 1279.82 Pa, which is close to the actual rms value of 1314.27 Pa.

It will be obvious to a person skilled in the art that with the advance of technology, the basic idea of the invention can be implemented in a plurality of ways. The invention and its embodiments are thus not restricted to the above examples but may vary within the scope of the claims.

Further the above-described embodiments of the present invention are intended to be examples only. Alterations, modifications and variations may be effected to the particular embodiments by those of skill in the art without departing from the scope of the invention, which is defined solely by the claims appended hereto

What is claimed is:

1. A system to determine impending oscillatory instabilities in a device, the system comprising:
   a sensor to detect an oscillatory variable;
   a signal conditioner connected to the sensor to condition and filter electrical signals from the sensor;
   an analog to digital convertor to convert electrical signals received from the signal conditioner;
   an amplitude estimator that estimates a root means square (rms) value or amplitude of limit cycle oscillations;
   a processing unit connected to the amplitude estimator compares a predicted oscillation amplitude or rms value with a threshold value or to compare a measured signal obtained from the said analog to digital converter with the predicted oscillation amplitude or rms value, characterized in that:
      the amplitude estimator continuously obtains segments of data associated with one or more parameters measured from the device in real time, wherein each of the segments of data comprises single input time series data with fixed length such that the segments collectively comprise multiple contiguously labelled time series of data, wherein each segment of data is acquired by varying control parameters of the device over time during a stable operation;
      the amplitude estimator estimates amplitude or rms value of the impending limit cycle oscillations in real time by modelling the device exhibiting oscillatory instability as a kicked oscillator based on the continuously obtained segments of data from the device during the stable operation; and
      the processing unit generates times the kicked oscillator is kicked using the parameters measured from the device and obtains the strength of kicking by determining a mean of all the obtained estimates of amplitude or rms value of the limit cycle oscillations; and
   a controller that controls the oscillatory variable to alter one or more operating inputs to restore stable operation of the system based on estimated amplitude.

2. The system as claimed in claim 1 wherein the parameters include but not limited to aperiodic probability, dominant time-period, the RMS value or amplitude of the limit cycle oscillations, and kicking times and kicking strength measured from the system.

3. The system as claimed in claim 1, wherein the device is a system with turbulent flow exhibiting oscillatory instabilities.

4. The system as claimed in claim 1, wherein the operating inputs altered to restore stable operation include one of air or fuel flow rate, degree of premixing or preheat temperature of air or fuel, length of the flame, fuel splitting, distribution of fuel or fuel injection or flame length or their combinations.

5. A method of estimating root means square (rms) or amplitude of limit cycle oscillations for systems susceptible to oscillatory instabilities comprising the steps of:
  a. detecting an oscillatory variable causing the limit cycle oscillations using a sensor mounted on the system;
  b. converting a signal detected as part of said detecting an oscillatory variable into digital signals in an analog-digital convertor;
  c. continuously obtaining segments of data associated with one or more parameters measured from the device in real time by an amplitude estimator, wherein each of the segments of data comprises single input time series data with fixed length such that the segments collectively comprise multiple contiguously labelled time series of data, wherein each segment of data is acquired by varying control parameters of the device over time during a stable operation;
  d. estimating the rms value or the amplitude of the impending limit cycle oscillations in real time by modelling the device exhibiting oscillatory instability as a kicked oscillator based on the continuously obtained segments of data from the device during the stable operation by an amplitude estimator;
  e. comparing the estimated value of the rms or the amplitude of limit cycle oscillations with a threshold value for the system, or comparing the measured signal obtained from the said analog to digital converter with the estimated amplitude or rms value;
  f. obtaining the strength of kicking by determining the mean of all the obtained estimates of amplitude or rms value of the limit cycle oscillations;
  g. creating appropriate instructions for controlling the system parameters of one or more of the systems susceptible to oscillatory instabilities to restore stable operation; and
  h. restoring the stability of one more of the systems susceptible to oscillatory instabilities by suitably adjusting the system parameters.

6. The method as claimed in claim 5, wherein the rms value or the amplitude of the limit cycle oscillations is estimated by modelling one or more of the systems exhibiting oscillatory instabilities as a kicked oscillator, generating the times at which the oscillator is kicked using one or more parameters measured from the system, and obtaining the strength of kicking.

7. The method as claimed in claim 5, wherein the parameters measured or estimated from one or more of the systems exhibiting oscillatory instabilities comprises aperiodic probability, dominant time-period, the RMS value or amplitude of the limit cycle oscillations, and kicking times and kicking strength.

8. The method as claimed in claim 5, wherein the controller is configured to alter one or more operating inputs to restore stable operation of one or more of the systems exhibiting oscillatory instabilities.

9. The method as claimed in claim 5, wherein the one or more of the systems exhibiting oscillatory instabilities is a system with turbulent flow exhibiting oscillatory instabilities such as combustion system, aero-elastic system or aero-acoustic system.

10. The method as claimed in claim 5, wherein the operating inputs altered to restore stable operation include but not limited to any of air or fuel flow rate, degree of premixing or preheat temperature of air or fuel, length of the flame, fuel splitting, distribution of fuel or fuel injection or flame length or their combinations.

* * * * *